United States Patent
Rosenzweig et al.

(10) Patent No.: US 9,888,051 B1
(45) Date of Patent: Feb. 6, 2018

(54) HETEROGENEOUS VIDEO PROCESSING USING PRIVATE OR PUBLIC CLOUD COMPUTING RESOURCES

(75) Inventors: Jesse J. Rosenzweig, Portland, OR (US); Samuel S. Blackman, Portland, OR (US); Brian G. Lewis, Portland, OR (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 278 days.

(21) Appl. No.: 13/164,060

(22) Filed: Jun. 20, 2011

Related U.S. Application Data

(60) Provisional application No. 61/469,972, filed on Mar. 31, 2011.

(51) Int. Cl.
*G06F 15/16* (2006.01)
*H04L 29/06* (2006.01)

(52) U.S. Cl.
CPC .......... *H04L 65/602* (2013.01); *H04L 65/607* (2013.01)

(58) Field of Classification Search
CPC H04L 29/08072; H04L 29/06; H04L 29/0809
See application file for complete search history.

(56) References Cited

U.S. PATENT DOCUMENTS

| | | | |
|---|---|---|---|
| 8,897,370 B1* | 11/2014 | Wang | H04N 19/139 375/240.2 |
| 2002/0116251 A1* | 8/2002 | Chen | G06Q 30/0283 705/400 |
| 2003/0191822 A1* | 10/2003 | Leighton et al. | 709/219 |
| 2004/0240548 A1* | 12/2004 | Morad et al. | 375/240.12 |
| 2007/0250754 A1* | 10/2007 | Costa et al. | 714/758 |
| 2009/0202068 A1* | 8/2009 | Qureshi et al. | 380/44 |
| 2010/0058354 A1* | 3/2010 | Fein et al. | 719/313 |
| 2010/0097473 A1* | 4/2010 | Park | H04N 5/23203 348/159 |
| 2010/0299313 A1* | 11/2010 | Orsini et al. | 707/652 |
| 2010/0325199 A1* | 12/2010 | Park et al. | 709/203 |
| 2011/0162025 A1* | 6/2011 | Kellerman et al. | 725/116 |
| 2011/0265157 A1* | 10/2011 | Ryder | 726/6 |
| 2012/0047535 A1* | 2/2012 | Bennett | G09G 3/003 725/62 |
| 2012/0089781 A1* | 4/2012 | Ranade et al. | 711/118 |
| 2012/0179822 A1* | 7/2012 | Grigsby et al. | 709/226 |
| 2012/0304233 A1* | 11/2012 | Roberts et al. | 725/82 |

\* cited by examiner

*Primary Examiner* — Abdullahi E Salad
(74) *Attorney, Agent, or Firm* — Hogan Lovells US LLP

(57) ABSTRACT

A system including one or more cloud computing units and a ground unit. The one or more cloud computing units may be configured to process video content. The ground unit may be configured to pre-process the video content and deliver the video content to the one or more cloud computing units.

20 Claims, 7 Drawing Sheets

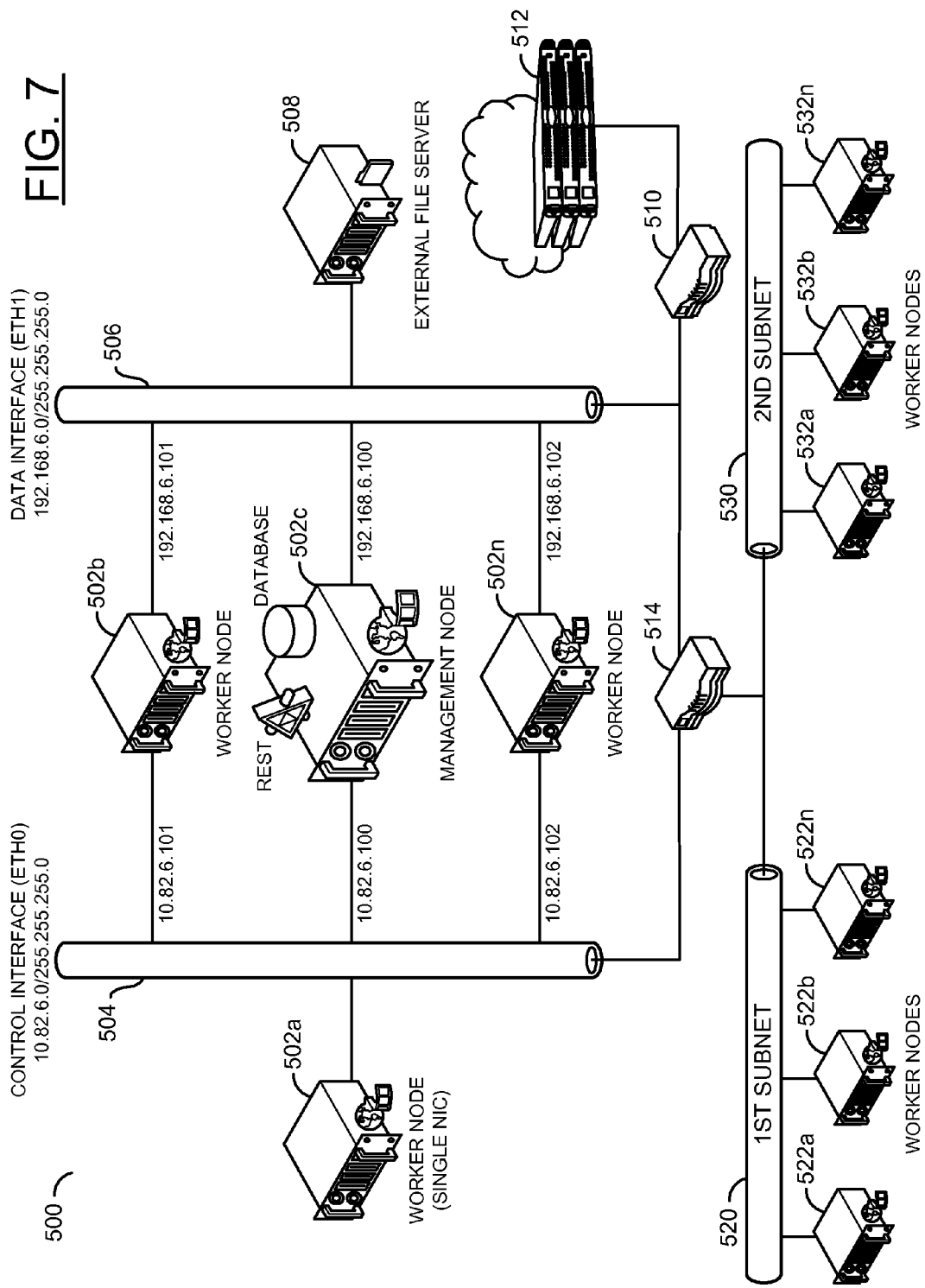

HETEROGENEOUS VIDEO PROCESSING USING PRIVATE OR PUBLIC CLOUD COMPUTING RESOURCES

This application claims the benefit of U.S. Provisional Application No. 61/469,972, filed Mar. 31, 2011 and is hereby incorporated by reference in its entirety.

FIELD OF THE INVENTION

The present invention relates to video distribution generally and, more particularly, to a method and/or architecture for heterogeneous video processing using private or public cloud computing resources.

BACKGROUND OF THE INVENTION

A modern video processing facility can require that an average amount of video processing power be physically located at the facility. A problem arises when the processing power physically located at the facility is insufficient for peak utilization. Such a situation can occur when a new device comes out or new standard is adopted. Renting cloud computing resources in times of peak demand is attractive to those that experience the above problem. The cloud computing resources are typically available on the Internet in the form of a public cloud. A public cloud, such as the Amazon Elastic Compute Cloud (Amazon EC2) provided by Amazon Web Services LLC or cloud computing products from Microsoft Corporation, provides a pool of computing resources that are available for general use by the public. Because the public cloud has questionable security, upload bandwidth issues, and non-deterministic availability of the resources, users can be hesitant to entrust content to a cloud based system.

SUMMARY OF THE INVENTION

The present invention concerns a system including one or more cloud computing units and a ground unit. The one or more cloud computing units may be configured to process video content. The ground unit may be configured to pre-process the video content and deliver the video content to the one or more cloud computing units.

The objects, features and advantages of the present invention include providing heterogeneous video processing using private or public cloud computing resources that may (i) provide an ability to span jobs across multiple cloud compute instances, (ii) provide fast ingestion to the cloud, (iii) add light compression in an endpoint of a ground unit prior to transfer to the cloud, (iv) provide proprietary encryption during transit, (v) use a hardware endpoint to provide fast encryption & watermarking, (vi) eliminate mezzanine files from being stored on cloud computing resources, (vii) provide guaranteed single-occupancy instances, (viii) ensure raw/uncompressed frames are present only in GPU memory, rather than in system memory, (ix) allow cloud computing units to start processing immediately, thus hiding transport latency, and/or (x) convert any and all video content into a format that may be streamed.

BRIEF DESCRIPTION OF THE DRAWINGS

These and other objects, features and advantages of the present invention will be apparent from the following detailed description and the appended claims and drawings in which:

FIG. 7 is a block diagram illustrating an example ground node cluster.

DETAILED DESCRIPTION OF THE PREFERRED EMBODIMENTS

Figure 1:
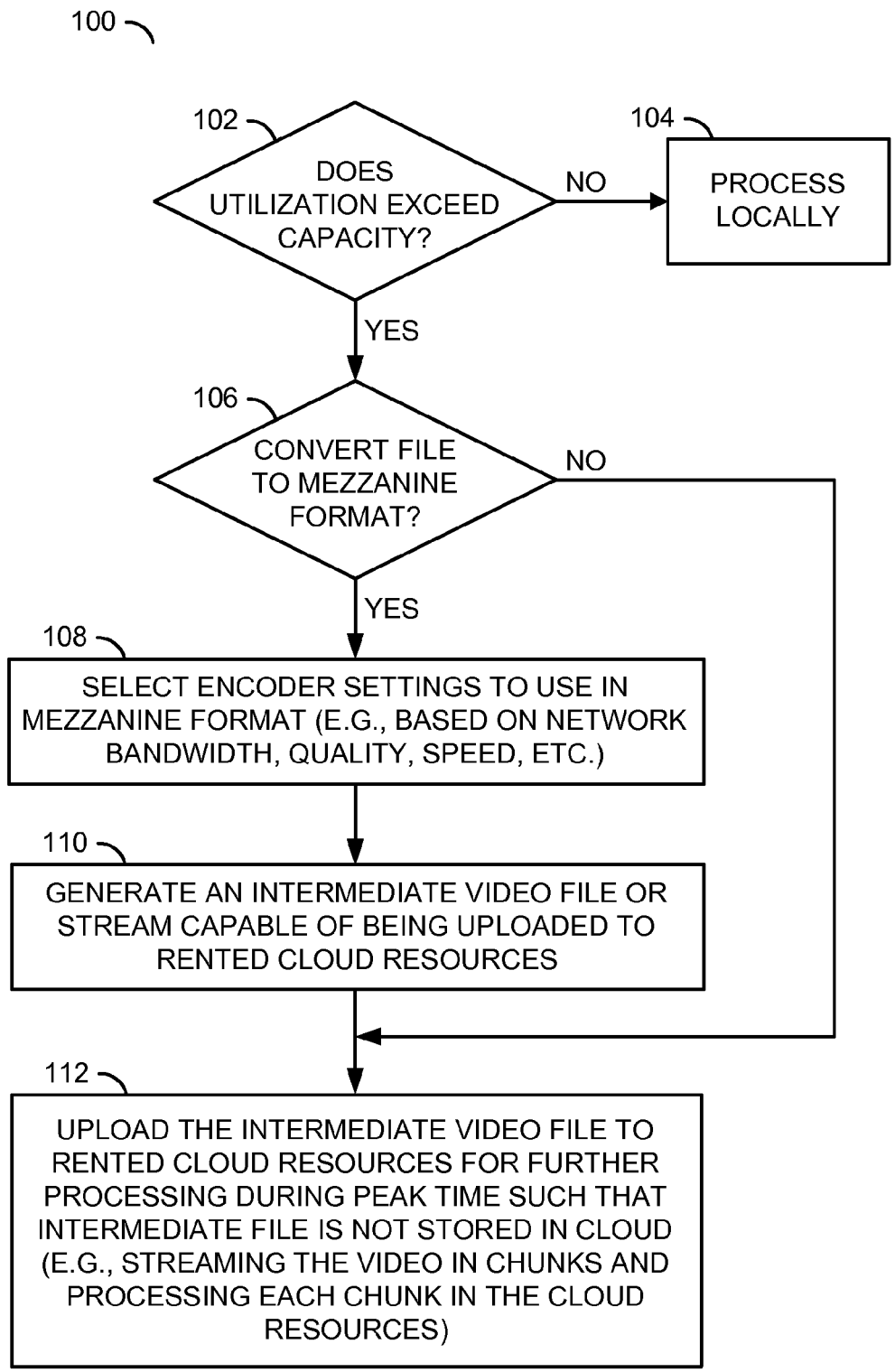
FIG. 1 is a flow diagram illustrating a process in accordance with an example embodiment of the present invention.

Referring to FIG. 1, a flow diagram is shown illustrating a process 100 in accordance with an example embodiment of the present invention. The process (or method) 100 may comprise a step (or state) 102, a step (or state) 104, a step (or state) 106, a step (or state) 108, a step (or state) 110, and a step (or state) 112. In the step 102, the process 100 may determine whether demand (or utilization) has exceeded a predefined threshold. For example, a demand or cost threshold may set by a user (e.g., using a system management component). In one example, a user interface may be implemented (e.g., a field, a knob, etc.) that allows the user to indicate how much the user is willing to spend (e.g., cost, quality, etc.) to get a job queue processed faster. The system may be configured to select local resources only or some combination of local resources and cloud resources (e.g., public, private, or a combination of public and private) based on the determination. For example, when the predefined threshold has not been exceeded, the process 100 may move to the step 104 where the processing of video, audio, and/or data is performed using local resources. When the predefined threshold is determined to have been exceeded, the process 100 may move to the step 106, where the system may prepare for using a combination of local and cloud resources for processing the video, audio, and/or data. The cloud resources may be part of a private cloud or a public cloud. In general, references herein to content and video content are also intended to mean the audio track(s) and data track(s) that may be associated with the content and video content. In one example, the term data track(s) is intended to include, but is not limited to, captioning, timecode information, rating information, emergency signaling, guide information, navigation information, digital rights information, trick play information, etc.

In the step 106, the process 100 may determine whether a file format of the content needs to be converted to a mezzanine format. The term mezzanine format generally means the highest quality format possible for efficient transfer to the cloud resources. The mezzanine format is generally used as the source content for further processing by the cloud resources. For example, some original video files may already be in a proper format (e.g., MPEG2-TS, chunked or fragmented MP4, etc.) for transfer to the cloud without format conversion. When the content comprises fragmented MP4, MPEG2-TS, or another container suitable for chunked transfers, the process 100 may move to the step 112. Otherwise, the process 100 generally moves to the step 108. In the step 108, the process 100 generally determines encoder settings to be used for the mezzanine format. For example, the encoder settings may be determined based upon network bandwidth measurements to the cloud units, quality and speed specifications set by the user (e.g., higher compression means faster transfer, but lower quality), etc. In one example, the encoder settings may be pre-programmed for particular content. In another example, the encoder settings may be dynamically set to take into account changes in content, network characteristics, end user equipment, etc. When the encoding settings have been selected, the process 100 may move to the step 110.

In the step 110, the process 100 may convert the video content to an intermediate video file or a stream capable of being uploaded to rented cloud resources (e.g., in the mezzanine format). With the content converted, the process 100 may move to the step 112. In the step 112, the process 100 may upload the intermediate video file or stream to the rented cloud resources for further processing during peak times. The intermediate file may be transferred such that the intermediate file is not stored in the cloud. For example, the video content may be streamed in chunks and processing of each chunk performed in the cloud resources. In one example, the transfer of content from ground to cloud may be accomplished over the HTTP or HTTPS protocol using a standard technology (e.g., WebDAV, etc.). In another example, the transfer of content from ground to cloud may be accomplished using a proprietary protocol, such as Real Time Messaging Protocol (RTMP) (from Adobe Systems Incorporated, San Jose, Calif.), to transfer the chunks. In one example, the chunks may be sent on parallel connections to further increase the speed of transfer to the cloud. Chunks may even be transferred to individual cloud instances to be processed in parallel and then stitched back together by a system management component, further increasing speed and security. Both public cloud and private cloud support may be natural applications of a system in accordance with embodiments of the present invention.

Figure 2:
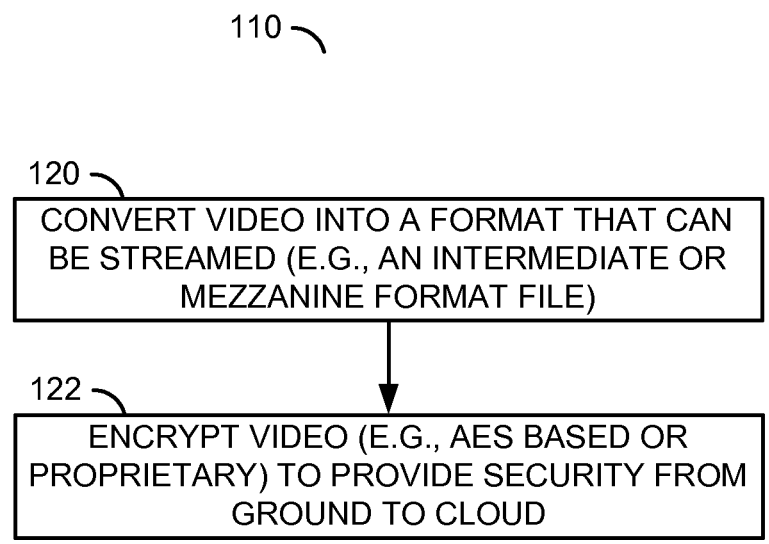
FIG. 2 is a flow diagram illustrating a process for generating an intermediate file.

Referring to FIG. 2, a flow diagram is shown illustrating an example process for implementing the step 110 of FIG. 1. In one example, the step 110 may comprise a step (or state) 120 and a step (or state) 122. In the step 120, the process 100 may convert video content into a format that may be streamed. For example, the video content may be converted to a mezzanine format for transfer in an intermediate file. The intermediate file may include, but is not limited to, MPEG-2 transport streams chunked into smaller time segments (e.g., 5-10 seconds). However, other values may be implemented due to latency requirements. The intermediate file content may be encoded (or compressed), for example, with H.264, MPEG-2, or any other video codec that may be used in a stream that is compliant with the MPEG-2 transport stream specification. Each segment may start with a group of pictures (GOP) resetting keyframe (e.g., an IDR frame in the H.264 standard, an I-frame in the MPEG-2 standard, etc.). Segments may be stitched back together in the cloud computing units and further cloud processing may begin immediately after receiving the first segment.

In the step 122, the process 100 may encrypt the video content to provide security for ground to cloud transfers. The encryption is generally only used for transport of the content to the cloud. Encryption may be performed using, for example, an AES-based or proprietary encryption scheme. Alternatively, changes may be made to the codec used on both sides of the transport. Changes to the codec may be made, for example, in the CABAC tables and/or bitstream, that only the system configurer knows about. Such changes would not be decodable by an off-the-shelf decoder.

Figure 3:
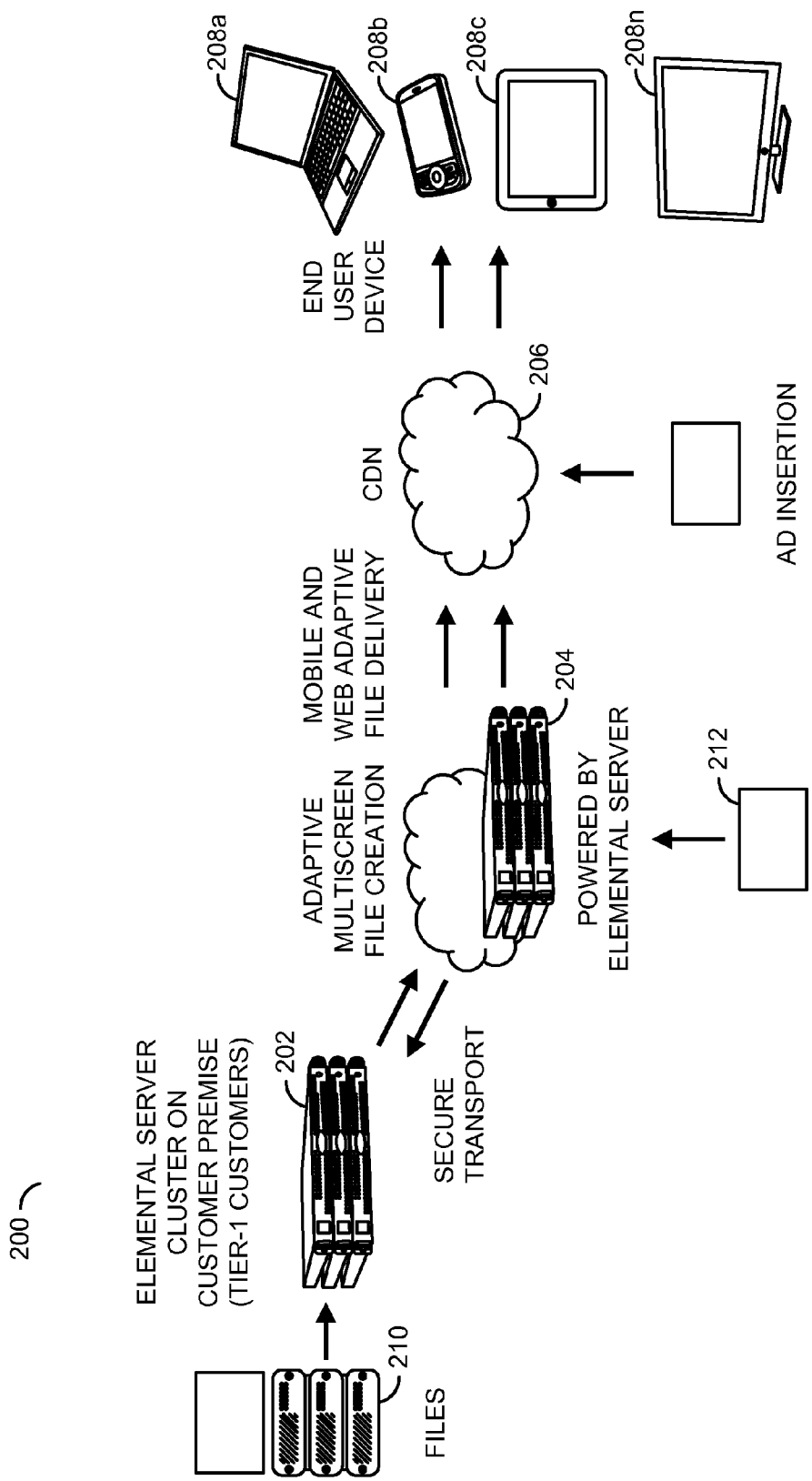
FIG. 3 is a block diagram illustrating a system in accordance with an example embodiment of the present invention.

Referring to FIG. 3, a block diagram is shown illustrating a system 200 in accordance with an example embodiment of the present invention. In one example, the system 200 may comprise one or more ground units 202, one or more cloud computing units 204, a network 206, and a number of end user devices 208a-208n. The ground unit 202 may be implemented, in one example, as a file based video processing system configured to provide fast, high-quality video transcoding for multi-screen video applications. The ground units 202 generally utilize massively parallel hardware combined with the flexibility and forward compatibility of intelligent software. For example, the ground units 202 may utilize graphics processing units (GPUs) to deliver simultaneous, faster-than-real-time conversion of multiple high density (HD) and standard density (SD) video streams across an array of devices. The array of device may include, but is not limited to televisions (TVs), personal computers (PCs), tablets, personal digital assistants (PDAs), mobile phones, etc. In one example, the ground units 202 may be implemented using a file-based video processing system that provides fast, high-quality video transcoding for multi-screen video applications (e.g., Elemental™ Server from Elemental Technologies Inc., Portland Oreg.). In another example, a single ground unit 202 or a cluster of ground units 202 may be located on the premises of a customer (e.g., tier 1 customers).

The cloud computing units 204 may be implemented, in one example, as file-based video processing systems configured to provide fast, high-quality video transcoding for multi-screen video applications. The cloud units 204 may utilize massively parallel hardware combined with the flexibility and forward compatibility of intelligent software. For example, the cloud units 204 may utilize graphics processing units (GPUs) to deliver simultaneous, faster-than-real-time conversion of multiple high density (HD) and standard density (SD) video streams across an array of devices. The array of device may include, but is not limited to televisions (TVs), personal computers (PCs), tablets, personal digital assistants (PDAs), mobile phones, etc. In one example, the cloud units 204 may be implemented using an Elemental™ Server appliance from Elemental Technologies Inc., Portland Oreg., an Amazon Elastic Compute Cloud, Microsoft cloud resources, Apple iCloud, etc. In one example, the network 206 may be implemented as a content distribution network (CDN). In another example, the network 206 may be implemented as a mobile carrier network. However, other networks and/or combinations of networks may be implemented accordingly to meet the design criteria of a particular implementation. The end user devices 208a-208n may be implemented using any of a number of device types. For example, the end user devices 208a-208n may include, but are not limited to, laptops, tablets, desktop computers, smart phones, PDAs, set-top-boxes (STBs), televisions, etc.

In one example, the system 200 may be configured to communicate a file or files 210 from the customer (content provider) location to one or more of the end user devices 208a-208n. For example, the file(s) 210 may be received by the ground unit 202. The ground unit 202 may be configured to process the file(s) 210 for transmission via secure transport to the cloud computing units 204. The cloud computing units 204 may be configured to further process the file(s) 210 sent from the ground unit 202. In one example, the ground units 202 and the cloud computing units 204 may be configured to process the video content using a heterogeneous video processing techniques that divide processing tasks between one or more central processing units (CPUs) and a graphics processing unit (GPU) that includes many parallel stream processors configured in an array. An example of such a heterogeneous video processing technique may be found in co-pending U.S. patent application Ser. No. 12/342,145, filed Dec. 23, 2008, which is hereby incorporated by reference in its entirety. In one example, the cloud computing units 204 may comprise a cluster of graphics processors whose capabilities may be harnessed by, for example, Amazon EC2 cluster GPU instances running a family of services (e.g., Elemental Accelerated Cloud Transcoding, or Elemental™ ACT, from Elemental Technologies Inc., Portland Oreg.) that provides elastic transcoding capacity in the cloud. The processed version of the file(s) 210 may be communicated from the cloud computing units 204 to the network 206 for distribution to the end user devices 208a-208n. In one example, during processing in the cloud computing units 204, material may be inserted into the files to be communicated to the end user. For example, advertisements 212 may be inserted into the video content of file 210 prior to distribution via the network 206. In another example, the advertisements 212 may be inserted while the file(s) 210 are within the network 206 awaiting distribution to the end users 208a-208n. Other configurations may be implemented accordingly to meet the design criteria of a particular distribution system.

Figure 4:
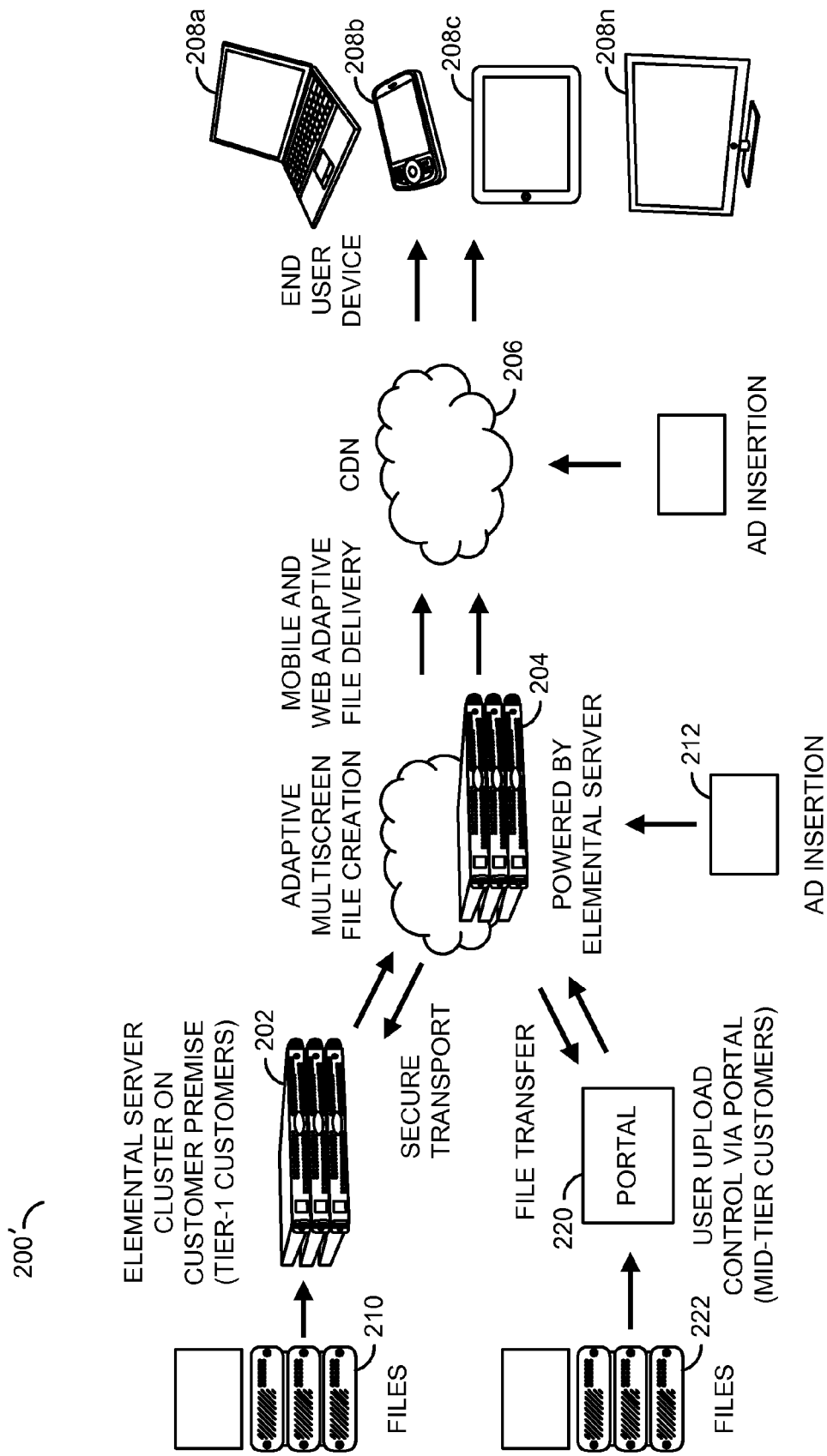
FIG. 4 is a block diagram illustrating another system in accordance with the present invention.

Referring to FIG. 4, a block diagram is shown illustrating a system 200' in accordance with another example embodiment of the present invention. In one example, the system 200' may be implemented similarly to the system 200 of FIG. 3, except that the system 200' may include a portal instrumentality 220. The portal instrumentality 220 may be used to transfer a file or files 222 to the cloud computing units 204. For example, the files 222 may be received by the portal instrumentality 220 for preprocessing prior to uploading to the cloud units 204. The portal instrumentality 220 may allow user upload control via portal routines. In one example, the portal instrumentality 220 may be made available to mid tier customers. In general, the portal instrumentality 220 may be implemented as a web application, a tablet or phone application, or a native PC application that may be configured to communicate with a cloud management service over a network to create cloud instances, open transfer portals, and upload the video content. In some implementations, the portal application may also be able to create the mezzanine format for faster transfer. Some tablets and phones already incorporate encoding hardware for generating mezzanine formats.

Figure 5:
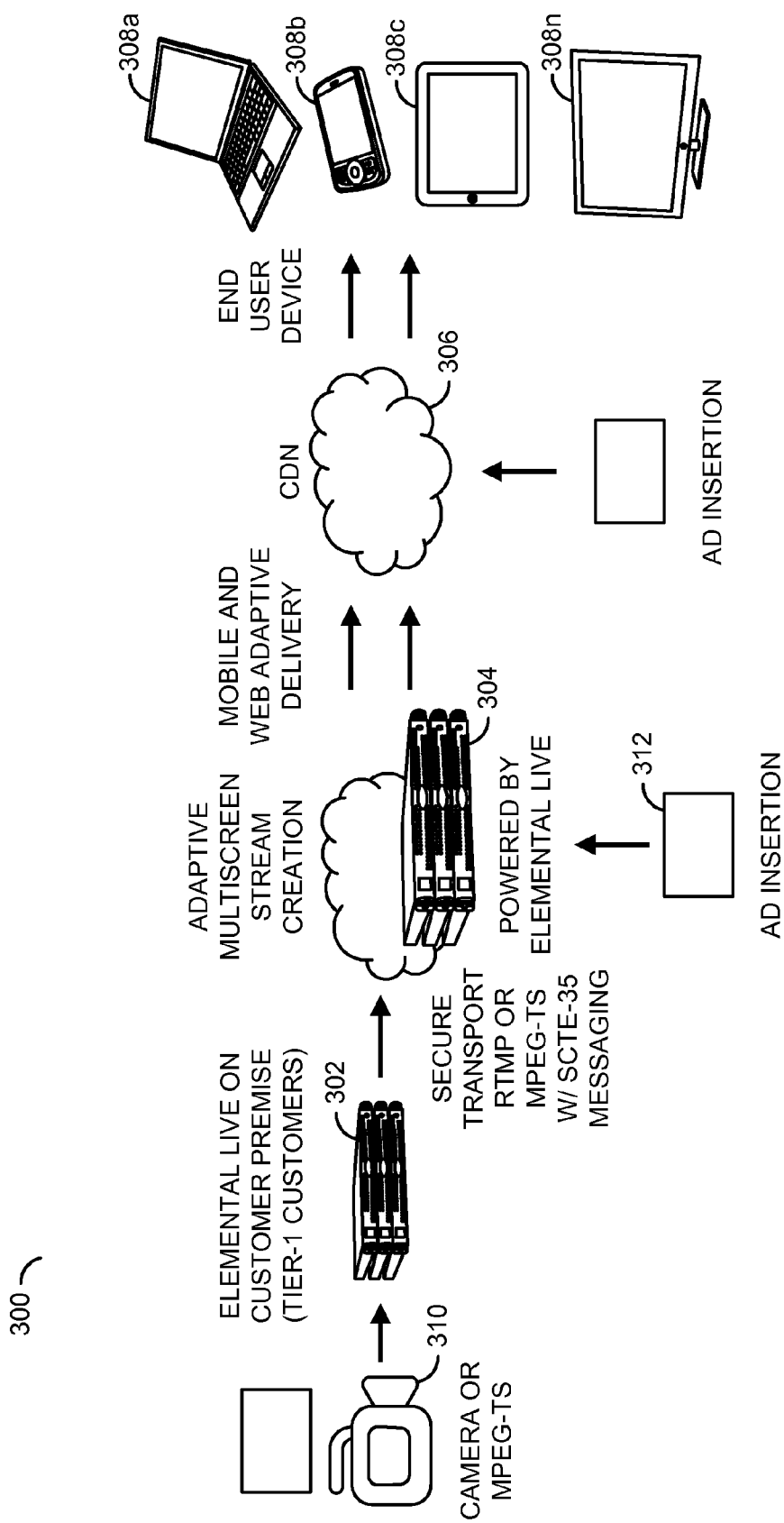
FIG. 5 is a block diagram illustrating another system in accordance with the present invention.

Referring to FIG. 5, a block diagram is shown illustrating a system 300 in accordance with another example embodiment of the present invention. In one example, the system 300 may comprise one or more ground units 302, one or more cloud computing units 304, a network 306, and end user devices 308a-308n. The one or more ground units 302 may be implemented, in one example, as a massively parallel video processing system configured to provide content distribution with video and audio encoding for live streaming to various media platforms. The ground units 302 may support, for example, adaptive bit-rate protocols, HTML5, and multiple HD streams. In one example, the ground units 302 may be implemented using one or more Elemental™ Live appliances from Elemental Technologies Inc., Portland, Oreg. The ground units 302 (e.g., single or clustered) may be located on the premises of a customer (e.g., tier 1 customers) or content provider.

The one or more cloud computing units 304 may be implemented, in one example, similarly to the ground units 302, using Elemental™ Live appliances, Amazon Elastic Compute Cloud instances, Microsoft cloud resources, etc. In one example, the network 306 may be implemented as a content distribution network (CDN). In another example, the network 306 may be implemented as a mobile carrier network. However, other networks and/or combinations of networks may be implemented accordingly to meet the design criteria of a particular implementation. The end user devices 308a-308n may be implemented using any of a number of device types. For example, the end user devices 308a-308n may include, but are not limited to, laptops, tablets, desktop computers, smart phones, PDAs, set-top-boxes (STSs), televisions, etc.

In one example, the system 300 may be configured to communicate live content (e.g., camera output, HD-SDI, MPEG-TS, etc.) 310 from the customer location to one or more of the end user devices 308a-308n. For example, the content 310 may be received by the ground unit(s) 302. The ground unit(s) 302 may process the content 310 for transmission via secure transport to the cloud computing units 304. The cloud computing units 304 may further process the content 310 sent from the ground unit 302. The ground units 302 and the cloud units 304 may be configured to provide a variety of device-optimized streams. For example, the ground units 302 and the cloud units 304 generally provide scalability, flexibility, simplicity, and seamlessness. With regard to scalability, the demand for an increasing variety of live streams is certain to grow. At the same time, the advent of 3D will double the required number of streams for many events. Either of these developments alone may make processing systems with limited simultaneous output capabilities a poor investment. Video processing systems need flexible processing algorithms and input/output support to keep pace with new video delivery channels. Systems that are intrinsically tied to conventional requirements may quickly lose utility as needs evolve. Simple, straightforward, streamlined systems that handle a wide range of requirements within a single consistent environment may provide much greater reliability and operational efficiency than patching together complex arrays of specialized boxes. With regard to seamlessness, adaptive bit rate streaming (e.g. Dynamic Streaming for Flash, Smooth Streaming for Silverlight, Apple HTTP Adaptive Streaming, etc.) may provide a far better user experience than fixed bit rate streaming. The video processing system implemented in accordance with an embodiment of the present invention may integrate frame-accurate synchronization that makes adaptive streaming work. The video processing system implemented in accordance with an embodiment of the present invention may provide the capability of serving all significant real-time delivery channels and also ensuring that on-demand content is available without delay when viewer interest is at its peak.

The processed content may be communicated from the cloud computing units 304 to the network 306 for distribution to the end user devices 308a-308n. In one example, during processing in the cloud computing units 304, material may be inserted into the live content being communicated to the end user(s). For example, advertisements 312 may be inserted into the content prior to distribution via the network 306. In another example, the advertisements 312 may be inserted into the content within the network 306 prior to distribution to the end users 308a-308n. Other configurations may be implemented accordingly to meet the design criteria of a particular distribution system.

Figure 6:
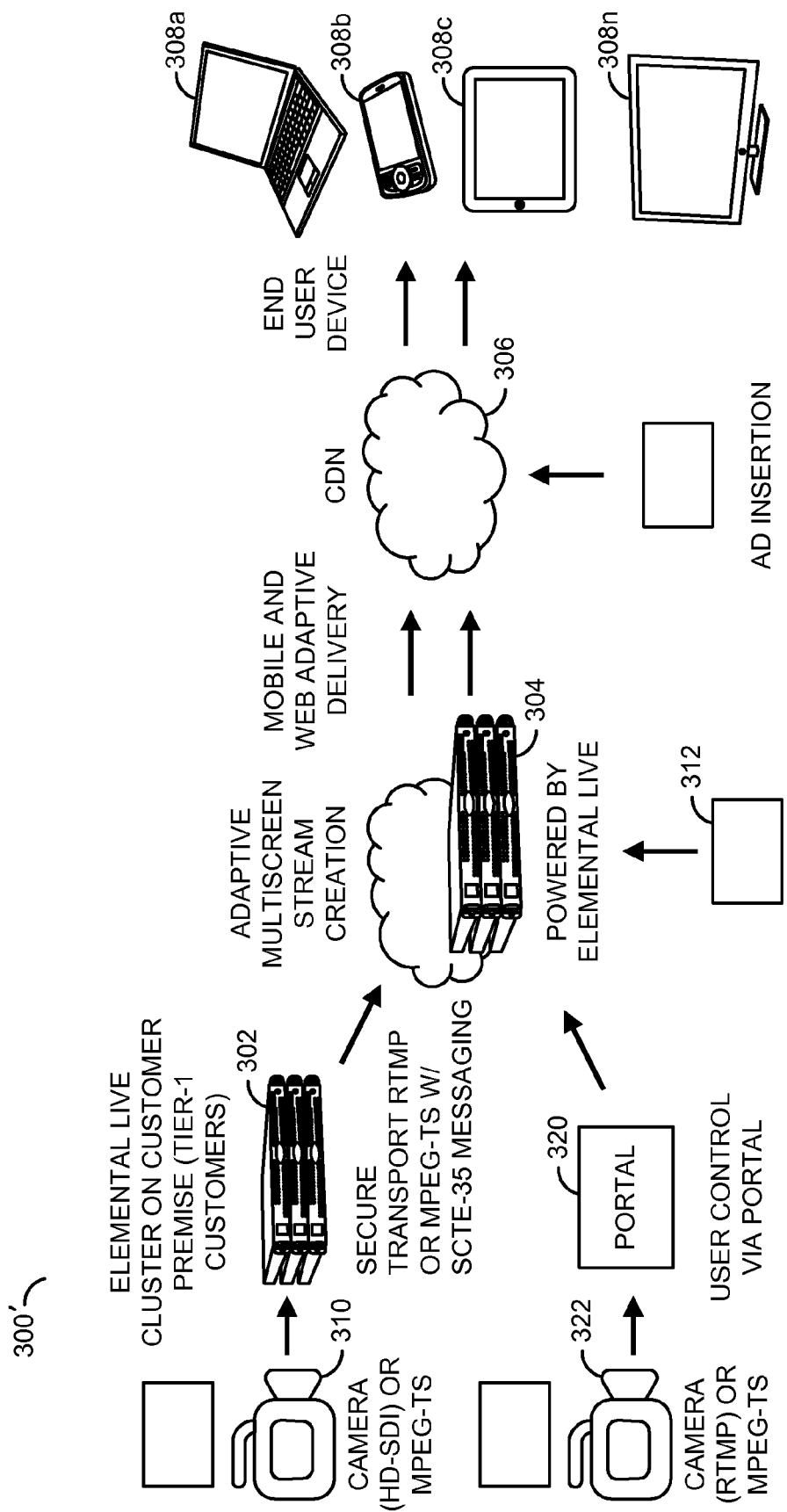
FIG. 6 is a block diagram illustrating another system in accordance with the present invention.

Referring to FIG. 6, a block diagram is shown illustrating a system 300' in accordance with another example embodiment of the present invention. In one example, the system 300' may be implemented similarly to the system 300 of FIG. 5, except that the system 300' may include a portal instrumentality 320 which may be used to transfer live content streams 322 to the cloud computing units 304. For example, the live content (e.g., camera, RTMP, MPEG-TS, etc.) 322 may be received to the portal instrumentality 320 for preprocessing prior to uploading to the cloud resources 304. The portal instrumentality 320 may allow user upload control via portal routines. In one example, the portal instrumentality 320 may be made available to mid tier customers. In general, the portal instrumentality 320 may be implemented as a web application, a tablet or phone application, or a native PC application that may be configured to communicate with a cloud management service over a network to create cloud instances, open transfer portals, and upload the video content. In some implementations, the portal application may also be able to create the mezzanine format for faster transfer. Some tablets and phones already incorporate encoding hardware for generating mezzanine formats.

The present invention generally solves the initial problems described above by using a ground unit that pre-processes the content and delivers the pre-processed content to cloud computing units, where further processing may be completed. The ground unit generally compresses, encrypts (e.g., with proprietary encryption), and delivers the content (e.g., in a streaming fashion) to the cloud computing units. The ground unit may also be used for traditional video processing. A number of ground units may be pooled together in a cluster to dynamically handle average and peak loads.

Referring to FIG. 7, a block diagram is shown illustrating a cluster 500 in accordance with an example embodiment of the present invention. The ground units may be clustered such that there is a system management component that manages a job queue. The job queue may then be shared to clustered worker nodes. Jobs may be either explicitly sent to the worker nodes, or the worker nodes may monitor the job queue for work to do. The worker nodes then take jobs and begin processing the jobs. The system management component may promote one or more standard ground units into a unit configured to process the video content for transfer to the cloud. The promoted unit may be referred to as a cloud conditioner unit or mezzanine creation unit. The act of promotion may be governed by user programmed criteria to use cloud instances due to peak load or a requirement to complete the job queue faster.

In one example, the cluster 500 may comprise a number of nodes 502a-502n, a first network interface 504, a second network interface 506, and a file server 508. In one example, the nodes 502a-502n may be implemented with streaming media servers. On of the nodes 502a-502n (e.g., 502c) may be designated as the management node. However, any of the nodes 502a-502n may take over the position of the management node in the event the node 502c fails. In one example, the node 502c is generally responsible for maintaining the shared database. However, each of the worker nodes 502a, 502b, and 502d-502n may, in one example, have a copy of the database for fail-back recovery. In one example, the management node may allow control of the cluster 500 through an intuitive web interface or REST/XML API. In one example, the first network interface 504 may be configured as a control interface and the second network interface 506 may be configured as a data interface. The second network interface 506 may connect the cluster 500 to the file server 508 and to a router 510. The router 510 may connect the cluster 500 to cloud computing units in a cloud 512 (e.g., via the internet). The first network interface 504 and the second network interface 506 may be implemented, in one example, as ethernet networks. However, other types of networks (e.g., internet, USB, optical, wireless, etc.) may be implemented accordingly to meet the design criteria of a particular implementation.

In one example, each node 502a-502n may be running a database instance (e.g., MySQL, etc.). Communication bus technology (e.g., HA-Linux Heartbeat, etc.) may be employed to provide a cluster infrastructure layer, and a cluster resource manager (e.g., HA-Linux Pacemaker) may be deployed on top of the infrastructure layer for cluster management. A clustered block device (e.g., DRBD®) may be used for the data store. DRBD® is a trademark of LINBIT HA-Solutions GmbH, Vienna, Austria. File and print services technology (e.g. Samba, etc.) may be used to serve the cluster file share, and each node serving interface may include a user interface (e.g., Apache web server, etc.).

The cluster 500 may further comprise a router 514 connected to the first network interface 504 and the second network interface 506. The router 514 may be configured to expand the cluster 500 to include a first subnet 520 and a second subnet 530. The first subnet 520 may link a number of worker nodes 522a-522n to the cluster 500. The second subnet 530 may link a number of worker nodes 532a-532n to the cluster 500.

The present invention may provide improvements over the conventional method which simply spends lots of time processing video while the customers for the video wait. The conventional method takes more and more time as more and more formats become available. A video processing device in accordance with the present invention that currently handles the average video processing load in a video processing facility may also be configured to intelligently create an intermediate video file or stream that may be uploaded to rented cloud resources for further processing during peak processing times. The intermediate video file (e.g., mezzanine file or stream), may be encrypted, compressed, and packaged in a way that the cloud resource(s) may start working on the intermediate video file immediately upon receiving the first segment.

The present invention generally provides advantages over what has been done before, including improvements in speed and security. With respect to speed, the present invention may facilitate fast ingestion to cloud resources (e.g., via Aspera/Signiant/Hibernia/Level 3), provide an ability to span jobs across multiple cloud computing instances (e.g., amazon machine instances or AMIs, etc.), and/or provide an endpoint on the ground that may add light compression for more speed. With respect to security, the present invention may provide, for example, 256-bit AES encryption during transit, a hardware endpoint on the ground that may provide fast encryption and watermarking, streaming that may eliminate the mezzanine format file from ever being stored on the cloud, and guaranteed single-occupancy instance. In one example, a CPU-only version may be implemented using a secure virtual machine. In general, raw/uncompressed frames are not maintained in system memory, but rather only exist in GPU memory. The present invention may provide post processing file cleanup to further ensure security. In one example, the ground units may be implemented as software running on, for example, a laptop. The software may perform the encryption, compression, packaging, and streaming. The software only version may be less capable when compared to the hardware version, but may broaden the access to the rentable cloud resources.

The present invention generally provides new features that may include, but are not limited to, conversion of any and all video content into a format that may be streamed; proprietary encryption of the video so that the ground to cloud stream is secure; streaming of video in chunks and processing each chunk in the cloud resources to prevent the entire content from being available on any one cloud computing unit; streaming the video to allow the cloud computing units to start processing immediately, thus hiding the transport latency; and optional GPU processing in the cloud computing units for maximum speed.

The term cloud compute instance is generally used to refer to a rentable compute instance (e.g., rentable by the hour). The term big red button generally refers to a user (e.g., human, automation system, etc.) controlled asynchronous message to the systems involved in the stream to switch to a different stream typically a commercial, but could be any other content. SCTE-35 is a message built into the stream that has information on when the commercials should be inserted (such as at the end of a dramatic sequence in the content, or every 15 minutes, etc). As used herein, the terms "simultaneous" and "simultaneously" are meant to describe events that share some common time period but the terms are not meant to be limited to events that begin at the same point in time, end at the same point in time, or have the same duration. Elemental™ Server, Elemental™ Live, and Elemental™ ACT are trademarks of Elemental Technologies, Inc., 620 SW Fifth Avenue, Suite 400, Portland, Oreg. 97204.

The functions performed by the diagrams of FIGS. 1-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A system comprising:
   one or more cloud computing units configured to receive video content in an intermediate video file or streaming format, transcode the video content to generate one or more video streams compatible with one or more end user devices, and communicate the transcoded video content in one or more video streams to a network for distribution to the one or more end user devices;
   a file based video processing system configured in a first mode, to fully process said video content to generate said one or more video streams containing the video content and compatible with the one or more end user devices using only local resources and, in a second mode, to convert said video content to said intermediate video file or streaming format using encoding settings determined based on network characteristics, the network characteristics including at least available bandwidth, and deliver said intermediate video file or streaming formatted video content to said one or more cloud computing units; and
   a management node comprising at least a processor and memory, the management node configured to determine whether utilization of said file based video processing system has exceeded a predefined cost threshold, wherein when said predefined cost threshold is not exceeded said first mode of said file based video processing system is used to generate said one or more video streams locally and when said predefined cost threshold is exceeded said second mode of said file based video processing system is used to generate said one or more video streams using a combination of said local resources and the one or more cloud computing units.

2. The system according to claim 1, wherein said file based video processing system is further configured to compress, encrypt, and deliver said video content to the one or more cloud computing units in said second mode.

3. The system according to claim 2, wherein said file based video processing system is further configured to encrypt said video content with proprietary encryption.

4. The system according to claim 2, wherein said file based video processing system is further configured to prevent the intermediate video file streaming formatted video content from being stored on said one or more cloud computing units by delivering said video content to said one or more cloud computing units in a container-based stream suitable for chunked transfers.

5. The system according to claim 1, wherein said file based video processing system is pooled in a cluster with one or more additional file based video processing systems.

6. The system according to claim 5, wherein said cluster of file based video processing systems is configured to dynamically handle average and peak loads.

7. The system according to claim 1, wherein said file based video processing system is used to fully process said video content while demand is below the predefined cost threshold, said file based video processing system is used to convert said video content for transfer to and final processing by said one or more cloud computing units when said demand is above said predefined cost threshold, and said management node is further configured to balance processing of said video content between said file based video processing system and said one or more cloud computing units based upon a user input.

8. The system according to claim 1, wherein said file based video processing system is configured to provide fast, high-quality video transcoding for multi-screen video applications.

9. The system according to claim 1, wherein said file based video processing system utilizes massively parallel hardware combined with intelligent software to provide fast, high-quality video transcoding for multi-screen video applications.

10. The system according to claim 1, wherein said file based video processing system utilizes graphics processing units (GPUs) to deliver simultaneous, faster-than-real-time conversion of multiple high density (HD) and standard density (SD) video streams across an array of said end user devices.

11. The system according to claim 10, wherein said array of said end user devices comprises one of more of a television, a personal computer, a tablet computer, a personal digital assistants (PDA), a mobile phone, and a smart phone.

12. A method for heterogeneous video processing using private or public cloud computing resources, said method comprising:
generating one or more video streams compatible with one or more end user devices from video content in a file based video processing system using only local resources when utilization of the file based video processing system has not exceeded a predefined cost threshold;
converting said video content to an intermediate video file or streaming format using encoding settings determined based on network characteristics, the network characteristics including at least available bandwidth, and delivering said video content in said intermediate video file or streaming format to one or more cloud computing units when utilization of the file based video processing system exceeds said predefined cost threshold;
generating at least a portion of said one or more video streams by transcoding said video content in said intermediate video file or streaming format to one or more formats compatible with at least a portion of said one or more end user devices using said one or more cloud computing units; and
communicating said portion of said one or more video streams from said one or more cloud computing units to a network for distribution to said at least a portion of the one or more end user devices.

13. The method according to claim 12, wherein converting said video content comprises:
compressing said video content; and
encrypting said video content.

14. The method according to claim 13, wherein encrypting said video content utilizes a proprietary encryption technique.

15. The method according to claim 13, further comprising preventing the intermediate video file or streaming formatted video content from being stored on said one or more cloud computing units by delivering said video content to said one or more cloud computing units in a container-based stream suitable for chunked transfers.

16. The method according to claim 12, wherein said file based video processing system is pooled in a cluster with one or more additional file based video processing systems.

17. The method according to claim 16, further comprising:
dynamically handling average and peak loads using said cluster of file based video processing systems and said one or more cloud computing units based upon a user input.

18. The method according to claim 12, further comprising:
fully processing said video content in said file based video processing system while demand is below said predefined cost threshold; and
converting said video content in said file based video processing system for transfer to and final processing by said one or more cloud computing units when said demand is above said predefined cost threshold.

19. The method according to claim 12, further comprising:
utilizing a plurality of graphics processing units (GPUs) to deliver simultaneous, faster-than-real-time conversion of multiple high density (HD) and standard density (SD) video streams across an array of said end user devices, wherein said array of said end user devices comprises one or more of a television, a personal computer, a tablet computer, a personal digital assistants (PDA), a mobile phone, and a smart phone.

20. A system comprising:
one or more cloud computing resources configured to receive video content in an intermediate video file or streaming format and transcode the video content to generate one or more video streams compatible with one or more end user devices, wherein the transcoded video content in the one or more video streams is distributed to an array of end user devices via a network;

an encoder, wherein, in a first mode, said encoder fully processes said video content to generate said one or more video streams compatible with the one or more end user devices using only local resources and, in a second mode, said encoder converts said video content to said intermediate video file or streaming format, encoding settings for the intermediate video file or streaming format determined based on network characteristics, the network characteristics including at least available bandwidth, and the converted video content is delivered to said one or more cloud computing resources as a compressed and encrypted stream or intermediate video file; and a management node comprising at least a processor and memory, the management node configured to determine whether utilization of said encoder has exceeded a predefined cost threshold, wherein when said utilization of said encoder does not exceed said predefined cost threshold said encoder generates said one or more video streams using only local resources and when said utilization of said encoder generates said one or more video streams using a combination of said local resources and the one or more cloud computing resources.

\* \* \* \* \*